(12) United States Patent
Boldrin et al.

(10) Patent No.: US 12,013,874 B2
(45) Date of Patent: Jun. 18, 2024

(54) BIAS DETECTION

(71) Applicant: International Business Machines Corporation, Armonk, NY (US)

(72) Inventors: Brianne Boldrin, Cary, NC (US); Eliza Salkeld, Raleigh, NC (US); Rebecca Rose James, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 17/121,458

(22) Filed: Dec. 14, 2020

(65) Prior Publication Data

US 2022/0188328 A1   Jun. 16, 2022

(51) Int. Cl.
*G06F 16/28* (2019.01)
*G06F 16/27* (2019.01)
*G06N 5/02* (2023.01)

(52) U.S. Cl.
CPC ............ *G06F 16/27* (2019.01); *G06F 16/285* (2019.01); *G06N 5/02* (2013.01)

(58) Field of Classification Search
CPC ........ G06N 20/00; G06N 20/20; G06N 7/005; G06N 5/02; G06N 5/022; G06N 5/025; G06N 5/04; G06N 3/08; G06Q 50/01; G06Q 30/02; G06Q 30/0201; G06Q 30/0282; G06F 17/16; G06F 16/27; G06F 16/285; G06F 16/287; G06F 16/335; G06F 16/337; G06F 16/345; G06F 16/355
See application file for complete search history.

(56) References Cited

U.S. PATENT DOCUMENTS

| | | | |
|---|---|---|---|
| 7,743,045 B2 | 6/2010 | Guha | |
| 8,229,795 B1 | 7/2012 | Myslinski | |
| 9,285,973 B1* | 3/2016 | Gable | G06Q 30/0282 |
| 10,261,947 B2* | 4/2019 | Frank | G06F 9/542 |
| 2009/0204655 A1* | 8/2009 | Wendelberger | G06Q 30/02 708/203 |
| 2015/0019640 A1* | 1/2015 | Li | G06F 16/248 709/204 |
| 2016/0162582 A1* | 6/2016 | Chatterjee | G06F 16/248 707/706 |
| 2016/0224803 A1* | 8/2016 | Frank | G06F 21/6245 |
| 2017/0309193 A1* | 10/2017 | Joseph | G09B 5/02 |
| 2018/0225693 A1* | 8/2018 | Postrel | G06Q 30/0236 |

(Continued)

FOREIGN PATENT DOCUMENTS

| | | |
|---|---|---|
| CN | 109656141 A | 4/2019 |
| WO | 2019175571 A1 | 9/2019 |

OTHER PUBLICATIONS

Anonymous. "System and Method for Locating Source of Bias." Published Oct. 19, 2018. 6 pages. Published by IP.com. https://priorart.ip.com/IPCOM/000255888.

(Continued)

*Primary Examiner* — Robert W Beausoliel, Jr.
*Assistant Examiner* — Cheryl M Shechtman
(74) *Attorney, Agent, or Firm* — Heather Johnston (57) ABSTRACT

A processor may identify one or more data fields of interest. The processor may receive data for each of the data fields of interest. The processor may compute one or more bias scores for the data fields of interest based on the data. The processor may develop a bias matrix with the bias scores. The processor may display the bias matrix to a user.

22 Claims, 7 Drawing Sheets

(56) References Cited

U.S. PATENT DOCUMENTS

| | | | |
|---|---|---|---|
| 2018/0349583 A1 | 12/2018 | Turgeman | |
| 2018/0357557 A1 | 12/2018 | Williams | |
| 2019/0042894 A1 | 2/2019 | Anderson | |
| 2019/0082224 A1 | 3/2019 | Bradley | |
| 2019/0099653 A1* | 4/2019 | Wanke | G06Q 50/01 |
| 2019/0354935 A1* | 11/2019 | Hanratty | G06Q 10/1053 |
| 2020/0082299 A1* | 3/2020 | Vasconcelos | G06N 20/00 |
| 2020/0184350 A1 | 6/2020 | Bhide | |
| 2020/0364245 A1* | 11/2020 | Sinha | G06F 16/355 |
| 2020/0380597 A1* | 12/2020 | Furbish | G06Q 40/02 |
| 2021/0011939 A1* | 1/2021 | Sardar | A63F 13/67 |
| 2021/0011958 A1* | 1/2021 | Cox | G06F 16/9535 |
| 2022/0414766 A1* | 12/2022 | Miroshnikov | G06Q 40/03 |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

Srivastava, B., et al., "Towards Composable Bias Rating of AI Services." Published Jan. 14, 2019. 6 pages. Published by ARXIV. https://arxiv.org/abs/1808.00089.

Yadav, K., et al., "Detecting Sentiments from Movie Reviews by Integrating Reviewer's Own Prejudice." Published 2015. 7 pages. Global Journal of Computer Science and Technology, v.15, i.2, v.1.0, 2015. Published by Global Journals, Inc.

* cited by examiner

BIAS DETECTION

BACKGROUND

The present disclosure relates generally to the field of perception analytics, and more specifically to bias detection and mitigation.

As technology advances, the impact of artificial intelligence (AI) and other cognitive tools increasingly impact the world. In AI modeling, bias is the tendency of a model to consistently make unsupported predictions as a result of failure to take into account all relevant information. Bias may result from a model's inability to learn a true signal from a dataset or it may result from erroneous assumptions which lead to missed relevant correlations. Bias may come in many forms: sample bias, selection bias, reporting bias, exclusion bias, measurement bias, recall bias, and observer bias, among others. Sample bias may be the result of training and validation datasets failures to reflect realities of the environment of use of the model. Selection bias may be the result of training and validation data not reflecting a random sample. Reporting bias may be the result of collected data not being a true representation of the real world. Exclusion bias may be the result of disposing of relevant data because it is erroneously tagged as irrelevant or unimportant, or it may be the result of excluding information which is relevant. Measurement bias may be the result of data distortion flowing from data collection for training and validation differing from data collected during use in the real world. Recall bias may be the result of inconsistent data labeling. Observer bias is also known as confirmation bias; it may be the result of expecting, consciously or subconsciously, certain data to tend toward certain determinations and as a result that data actually does tend toward those determinations.

SUMMARY

Embodiments of the present disclosure include a system, method, and computer program product for bias detection and mitigation.

In some embodiments of the present disclosure, a processor identifies one or more data fields of interest. The processor may receive data for each of the data fields of interest. The processor may compute one or more bias scores for the data fields of interest based on the data. The processor may develop a bias matrix with the bias scores. The processor may display the bias matrix to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of perception analytics, and more specifically to bias detection and mitigation. It will be readily understood that the instant components, as generally described and illustrated in the figures herein, may be arranged and designed in a wide variety of different configurations. Thus, the following detailed description of the embodiments of at least one of a method, apparatus, non-transitory computer readable medium, and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language throughout this specification refers to the fact that a particular feature, structure, or characteristic described in connection with the embodiment may be included in at least one embodiment. Thus, appearances of the phrases "example embodiments," "in some embodiments," "in other embodiments," or other similar language throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or a two-way arrow. Also, any device depicted in the drawings can be a different device. For example, if a mobile device is shown sending information, a wired device can also be used to send the information.

Bias may be mitigated to obtain de-biased models and thereby produce fairer modeling. Fairness may be used to measure potential bias of a model exhibits. A model is considered to be fair when results are independent of inconsequential variables. For example, if an application approval AI system for a bank were considering approving a loan to a person, a model used by the application approval AI system may be more objectively fair if the decision is not influenced by the date of birth of the person because the date of birth of a person does not impact the ability of that person to repay the loan.

AI modeling is biased because individuals construct the AI models and individuals have bias. Individuals may contribute bias to their work and work product consciously or unconsciously. Work, work products, and other results may be made fairer by mitigating bias. To properly mitigate bias, it should first be detected so that the proper mitigation may be conducted.

Bias may be visualized as a scale that is off balance; if the unbalance is recognized, it may be corrected by countervailing it. In a similar way, bias may be mitigated by detecting the bias and compensating for it. The present disclosure offers various contributions to the art. Among these contributions are individual and team bias detection, awareness, and mitigation.

In some embodiments of the present disclosure, computing one or more bias scores includes aggregating the data into data field groups associated with data fields of interest and evaluating a bias score for each of the data field groups such that the bias score is an output. One or more bias scores may be computed for one or more of the data fields of interest based on the data. A bias matrix may be developed from the one or more bias scores, and the bias matrix may be displayed to a user.

Figure 1:
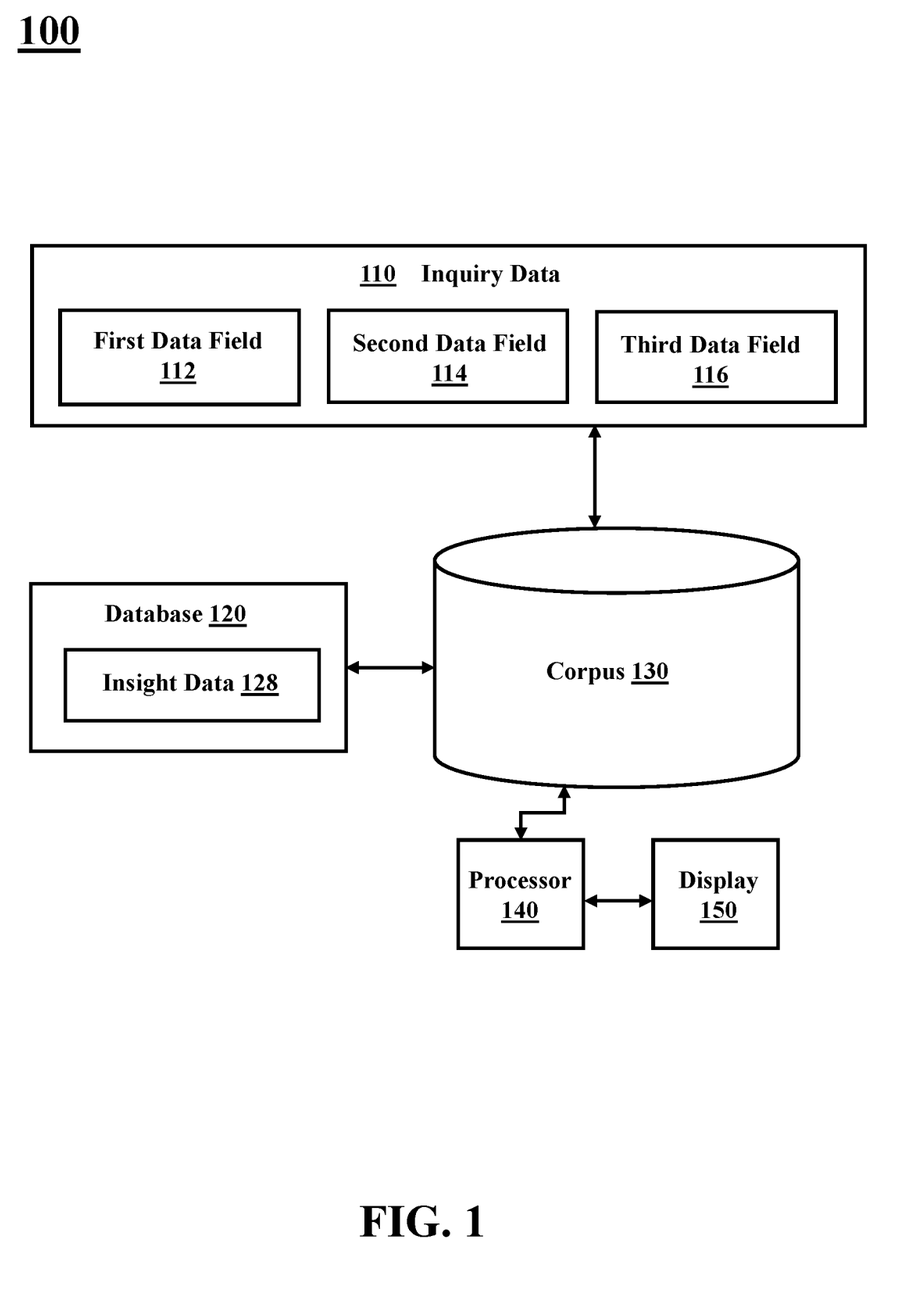
FIG. 1 illustrates a system and components for generating a bias score according to embodiments of the disclosure.

FIG. 1 illustrates a system and components for generating a bias score 100 according to embodiments of the disclosure. Some embodiments of the present disclosure for bias detection and mitigation may include a processor identifying one or more data fields 112, 114, and/or 116 of interest. The processor may receive data for each of the data fields 112, 114, and 116 of interest. The processor may compute one or more bias scores for the data fields 112, 114, and 116 of interest based on the data. The processor may develop a bias matrix with the bias scores. The processor may display the bias matrix to a user.

Data fields 112, 114, and 116 of interest may include any type of information which may identify one or more potential predispositions. Data fields 112, 114, and 116 of interest may incorporate information available in a database 120 as well as data which may be collected from a user via a prompt or questionnaire (e.g., inquiry data 110). Data fields 112, 114, and 116 of interest may include, for example, background data, education data, personality, et cetera.

In some embodiments of the present disclosure, receiving data includes accepting user input data (e.g., inquiry data 110) from a user, and inquiry data 110 may be submitted to a corpus 130. In some embodiments, accepting the user input data includes providing the user with a prompt and analyzing user results from the prompt; in some embodiments, the prompt includes one or more inquiries of the user. A user may be prompted to input inquiry data 110 via a prompt, such as via a pop-up display or an email. Inquiry data 110 may be any data collected via inquiry. An inquiry may include one or more questions, questionnaires, guided response fields, or other open response fields, or similar. An inquiry may be used in, as, or as part of a prompt to obtain information from a user.

In some embodiments of the present disclosure, receiving data includes harvesting social media for the social media data of the user. Data about a user may be available on a database 120. The database 120 may be, for example, one or more social media platforms which the user has used. The user may opt to permit the database 120 to be harvested such that insight data 128 may be gathered from the profile and/or other interactions the user has had with the database. For example, the user may have previously taken a personality test to acquire insight data 128; the user may decide to use that insight data 128 to garner personality insights and therefore request the personality test information be harvested for insight data 128 to be submitted to the corpus 130. In some embodiments, harvesting social media includes analyzing interactions with posts that include metadata associated with the data aggregated into the data field groups.

A database 120 may include information about the background, education, and/or personality (based on insight data 128) of a user. For example, a user may maintain a profile on a social media website which contains information about various aspects of the user; the user may, for example, include education data and career data in the basic information section, background (e.g., places lived, etc.) data in a bio, and personality data that is identified from the interactions the user has with other members of the social media site.

In some embodiments of the present disclosure, receiving data includes a combination of accepting user input data from a user and harvesting social media for social media data for the user. For example, a user may submit inquiry data 110 to supply background data (e.g., data field 112) and educational data (e.g., data field 116) and social media harvesting may be used on a social media database (e.g., databased 120) to obtain insight data 128. Inquiry data 110 and data harvested from the database 120 may complement one another in the same data field. For example, a user may submit inquiry data 110 pertaining to background data (e.g., data field 112) and insight data 128 and social media harvesting may be used on a social media database (e.g., databased 120) to obtain additional background data (e.g., data field 112) and/or insight data 128.

Any type of data may be collected in any feasible manner. For example, in some embodiments, a user may decline social media harvesting and choose to take a personality questionnaire to obtain (personality) insight data 128. In some embodiments, a user may opt into social media harvesting such that insight data 128, data field 112, data field 114, and data field 116 data may all be pulled by social media harvesting. In some embodiments, a user may opt in to social media harvesting to pull user data for one or more types of data and complement the data pulled from the one or more databases 120 with inquiry data 110 which the user may submit to a corpus 130 via inquiry.

In some embodiments of the present disclosure, receiving data includes accepting user input data from a user and harvesting social media for social media data affiliated with the user. In some embodiments of the present disclosure, accepting user input data includes providing a user with a prompt and analyzing user results from the prompt; in some embodiments, the prompt includes one or more inquiries of the user. In some embodiments of the present disclosure, harvesting social media for social media data includes analyzing interactions with posts wherein the posts include metadata associated with the data.

Various types of data may be analyzed to detect bias. Specified data fields 112, 114, and/or 116 may be of interest to determine certain kinds of bias. Data may be aggregated into data field groups associated with various data fields of interest. Data fields 112, 114, and/or 116 of interest may include, for example, background data, education data, personality data, etc. Data fields 112, 114, and 116 of interest may also be sub-fields of larger fields of interest. For example, background data of data field 112 may include environmental data as a type of background data, and the environmental data may be a data field 112, 114, and/or 116 of interest.

In some embodiments of the present disclosure, the data fields 112, 114, and/or 116 include background, personality, and/or education. Background data may include environmental data, data regarding knowledge of various topics (e.g., health, finances, et cetera), et cetera. Education data may include data concerning education level, education type, number of languages known, proficiency in known language(s), certifications, etc. Personality data may include data concerning social media votes, social media likes, social media themes, personality type, etc.

In some embodiments, a bias score reflects the bias of a user within a data field 112, 114, and/or 116 of interest. For example, background data may include information to calculate a bias score specifically based on the environmental data associated with a user (e.g., did the user grow up in a city, suburb, etc.), and a bias score may be calculated for the user based on the environmental data. A bias score calculated based on the environmental data associated with a user may be used to compute a bias score for the background of the user.

In some embodiments of the present disclosure, computing the bias scores includes classifying types of bias into bias classifications. Bias classifications may include, for example, a negative, neutral, or positive bias. Bias may be classified for an overarching theme of bias for a user, for a theme of a data field 112, 114, and/or 116, or as a theme of a subfield within a data field 112, 114, and/or 116. For example, a user may have an overarching neutral classification, a positive education classification, and a negative certification classification; such a user may, for example, have graduated from an engineering undergraduate program but not have an engineer-in-training designation.

Data in each data field 112, 114, and/or 116 may be discrete such that each item of interest is unique to a specific data field or may be held in common with one or more other data fields. For example, in some embodiments, a certain data point about an individual may only reflect on the education of that individual whereas another data point may reflect on both the education and the personality of the individual. Data may be binned into intersectional fields to garner additional insights such as, for example, metadata which may reveal themes in the data.

In some embodiments, inquiry data 110 and any data found in database 120 may be submitted to a corpus 130. The corpus 130 may provide the collected data to a processor 140 to compute a bias score or a bias matrix, and the bias score or bias matrix may be communicated via a display 150 to a user. Multiple bias scores and/or bias matrices may be computed at once and displayed simultaneously or in short order. In some embodiments, multiple bias scores and/or bias matrices may be calculated for a team, the bias scores/matrices of each member of the team may be aggregated into a team bias score and/or a team bias matrix.

Figure 2:
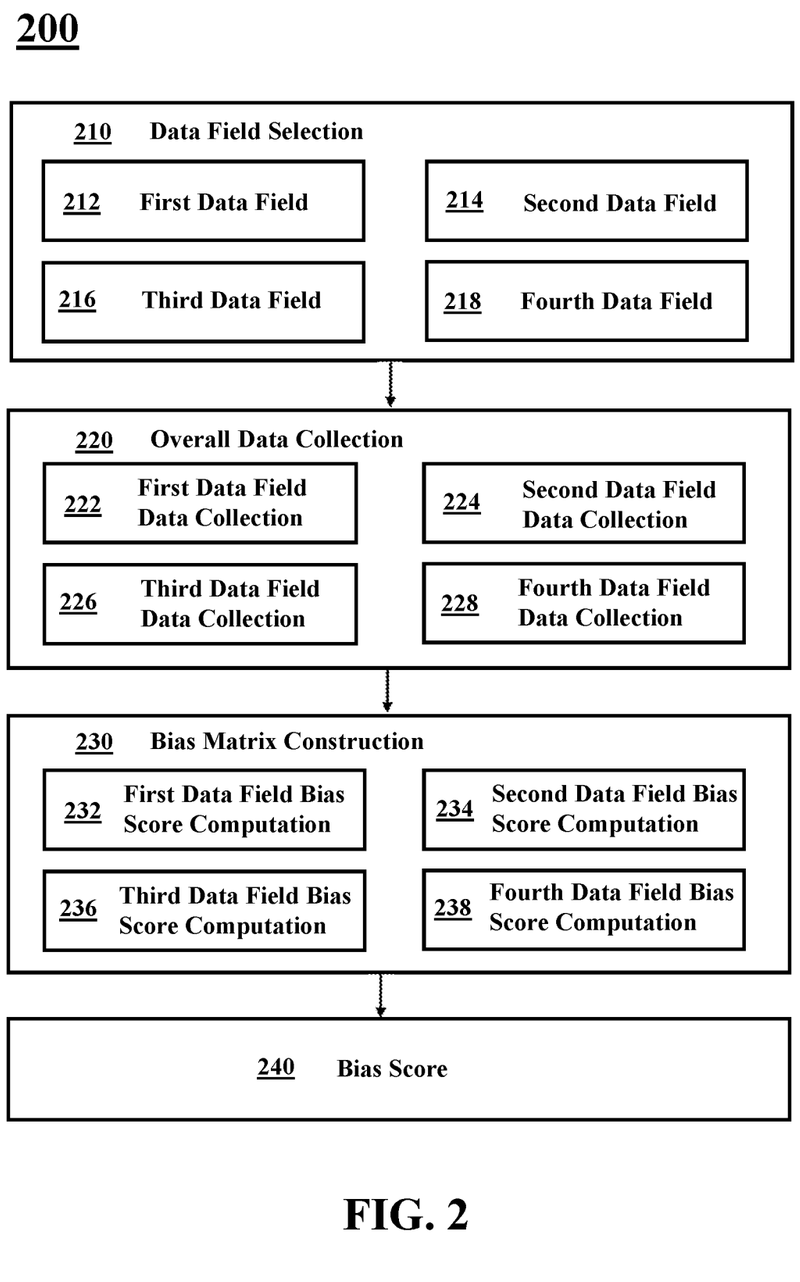
FIG. 2 illustrates a flowchart of generating an individual predisposition score according to embodiments of the disclosure.

FIG. 2 illustrates a flowchart of generating an individual bias score 200 according to embodiments of the disclosure. Some embodiments of the present disclosure for bias detection and mitigation may include identifying data fields 212, 214, 216, and/or 218 of interest, receiving data for each of the data fields 212, 214, 216, and/or 218 of interest, computing bias scores for the data fields 212, 214, 216, and/or 218 of interest based on the data, developing a bias matrix with the bias scores, and displaying the bias matrix via a display.

Generating an individual bias score 200 may include data field selection 210 and overall data collection 220 for insights on the individual with respect to each data field 212, 214, 216, and/or 218. Generating an individual bias score 200 may include bias matrix construction 230 based on bias scores computed for each of the data fields. Generating an individual bias score 200 may include computing and/or outputting an (individual) bias score 240 from a constructed bias matrix 230.

Data fields may be selected 210. Selected data fields 210 may include data fields 212, 214, 216, and/or 218, which could be, for example, a background of a user, a career of the user, an education of the user, and/or personality of the user (e.g., INTJ, etc.).

Overall data may be collected 220 for the data fields selected 210. Overall data collection 220 may include data field collections 222, 224, 226, and/or 228. Overall data collection 220 may use one or more methods of collecting data in regard to the data fields 212, 214, 216, and/or 218 to produce the data field collections 222, 224, 226, and/or 228. Overall data may be collected 220 from existing data sources, such as a database with information about an individual, as well as or in addition to new data sources, such as a questionnaire completed and submitted specifically for the purpose of evaluating an individual bias score.

An existing data source may be, for example, a social media profile of the individual which may be mined for information via social media harvesting. An existing source of data may be a document describing the individual or a perspective the individual offers, such as a résumé, curriculum vitae, scholastic article, blog post, book, et cetera. Using a natural language processor may also enable the submission of additional information such as, for example, audio and/or video interviews of the individual, discussions between the individual and another person, and/or reactions by the individual to various stimuli.

A new data source may be, for example, an inquiry such as a questionnaire prompted to an individual which the individual completes and submits for bias score calculation. An inquiry may include questions to an individual about the individual. For example, an inquiry may include questions relating to the background of the individual such as, for example, what kind of house the individual grew up in, et cetera.

A bias matrix may be constructed 230 based on the overall data collection 220 (e.g., the data field data collections 222, 224, 226, and 228). Data field bias score computations 232, 234, 236, and 238 may be computed for each data field 212, 214, 216, and 218 and be used to construct 230 a bias matrix. A first data field bias score may be computed 232 based on data received from the first data field data collection 222, a second data field bias score may be computed 234 based on data received from the second data field data collection 224, an third data field bias score may be computed 236 based on data received from the third data field data collection 226, and/or a fourth data field bias score may be computed 238 based on data received about from the fourth data field data collection 228. The bias scores for each data field 212, 214, 216, and 218 from the computations 232, 234, 236, and 238 may be compiled into a bias matrix for the individual. The bias matrix may represent the bias score 240. In some embodiments, the bias matrix may be condensed into a solitary numerical bias score 240, whereas in other embodiments the bias matrix may itself be the expression of the bias score 240.

Figure 3:
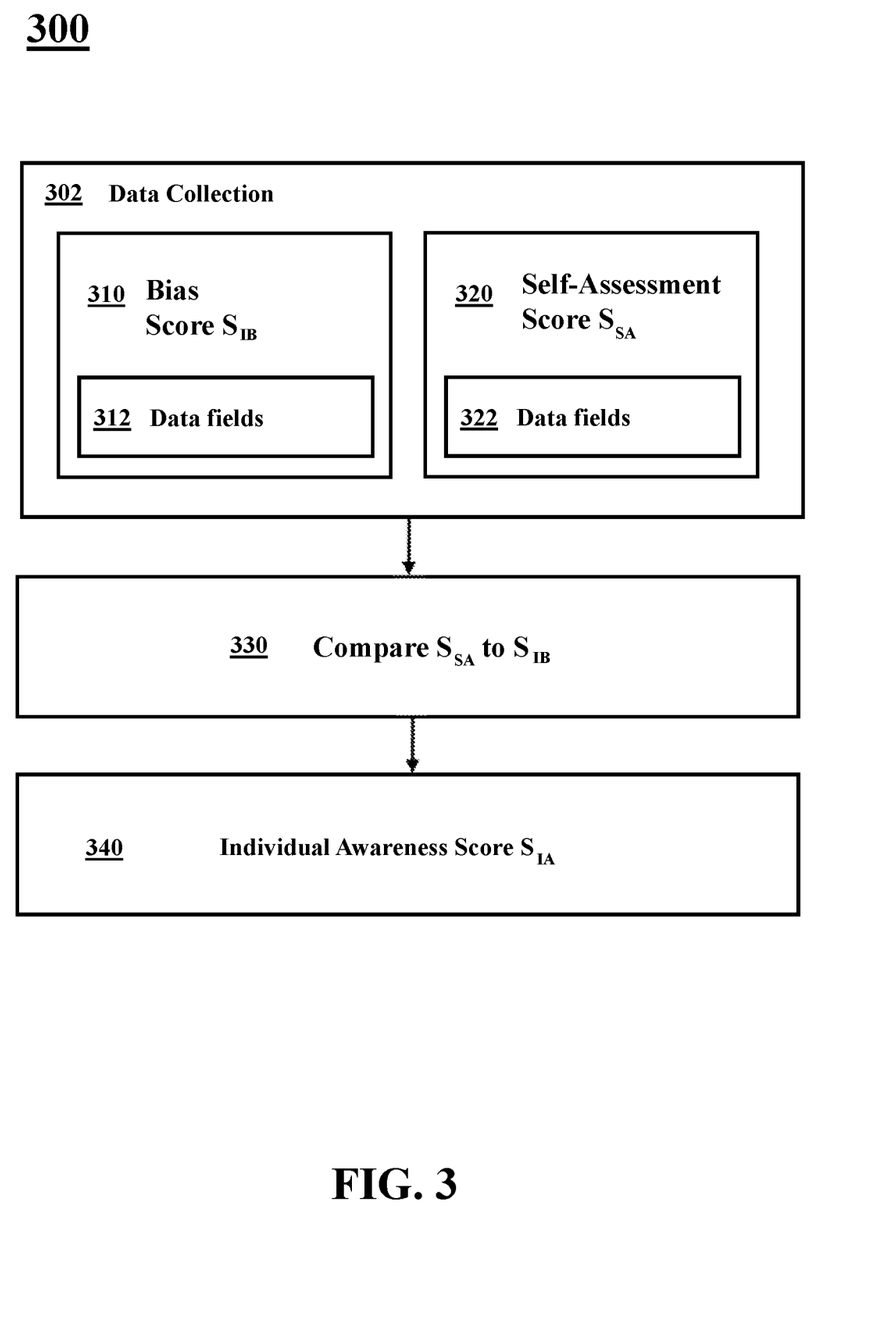
FIG. 3 illustrates a flowchart of generating an individual awareness score according to embodiments of the disclosure.

Turning now to FIG. 3, illustrated is a flowchart diagram of generating an individual awareness score 300 according to embodiments of the disclosure.

Data may be collected 302 including data relating to an (individual) bias score $S_{IB}$ 310 and self-assessment score $S_{SA}$ 320. An bias score $S_{IB}$ 310 may include information about the data fields 312, which may include any of the data fields previously discussed in regard to FIGS. 1 and 2. An bias score $S_{IB}$ 310 may be a bias matrix constructed out of bias scores computed for an individual.

A self-assessment score $S_{SA}$ 320 may include information about what biases the individual recognizes (e.g., preference for beach vacations over ski vacations, etc.) in that person's own data fields 322, which may also include any of the data fields previously discussed in regard to FIGS. 1 and 2. The individual may gauge and self-report their own biases with respect to the various data fields (e.g., 322) of interest.

The self-assessment score $S_{SA}$ 320 and the bias score $S_{IB}$ 310 may be compared 330. The comparison 330 of the self-assessment score $S_{SA}$ 320 to the bias score $S_{IB}$ 310 may render an individual awareness score $S_{IA}$ 340:

$$S_{IA} = S_{IB} - S_{SA}$$

An individual awareness score $S_{IA}$ 340 indicates a high awareness of the individual of the biases of the individual. In some embodiments, an awareness score $S_{IA}$ 340 may be expressed as an individual awareness score matrix to specifically identify levels of awareness within various areas of bias. An individual awareness score matrix may be expressed as:

$$\begin{bmatrix} B_{IA} \\ C_{IA} \\ E_{IA} \\ P_{IA} \end{bmatrix}_{S_{IA}} = \begin{bmatrix} B_{IB} \\ C_{IB} \\ E_{IB} \\ P_{IB} \end{bmatrix}_{S_{IB}} - \begin{bmatrix} P_{SA} \\ C_{SA} \\ E_{SA} \\ P_{SA} \end{bmatrix}_{S_{SA}}$$

wherein S indicates a score, B indicates a background score, C indicates a culture score, E indicates an education score, P indicates a personality score, subscript IA indicates individual awareness, subscript IB indicates individual bias, and subscript SA indicates self-awareness.

In certain embodiments, the awareness score may be normalized such that the individual awareness score $S_{IA}$ 340 is within certain bounds (e.g., between negative one and positive one or between negative ten and positive ten). In some embodiments, such normalization will be built into the data collection phase such that the data collected is normalized prior to computing the individual bias score $S_{IB}$ 310, the self-assessment score $S_{SA}$ 320, and/or the individual awareness score $S_{IA}$ 340.

In some embodiments of the present disclosure, the bias matrix is respectively computed for each member of a group of users and each bias score is respectively associated with each member. In some embodiments, the bias matrices from the members of the group are aggregated into a group bias matrix which may be associated with the collective or overall bias of the group.

Figure 4:
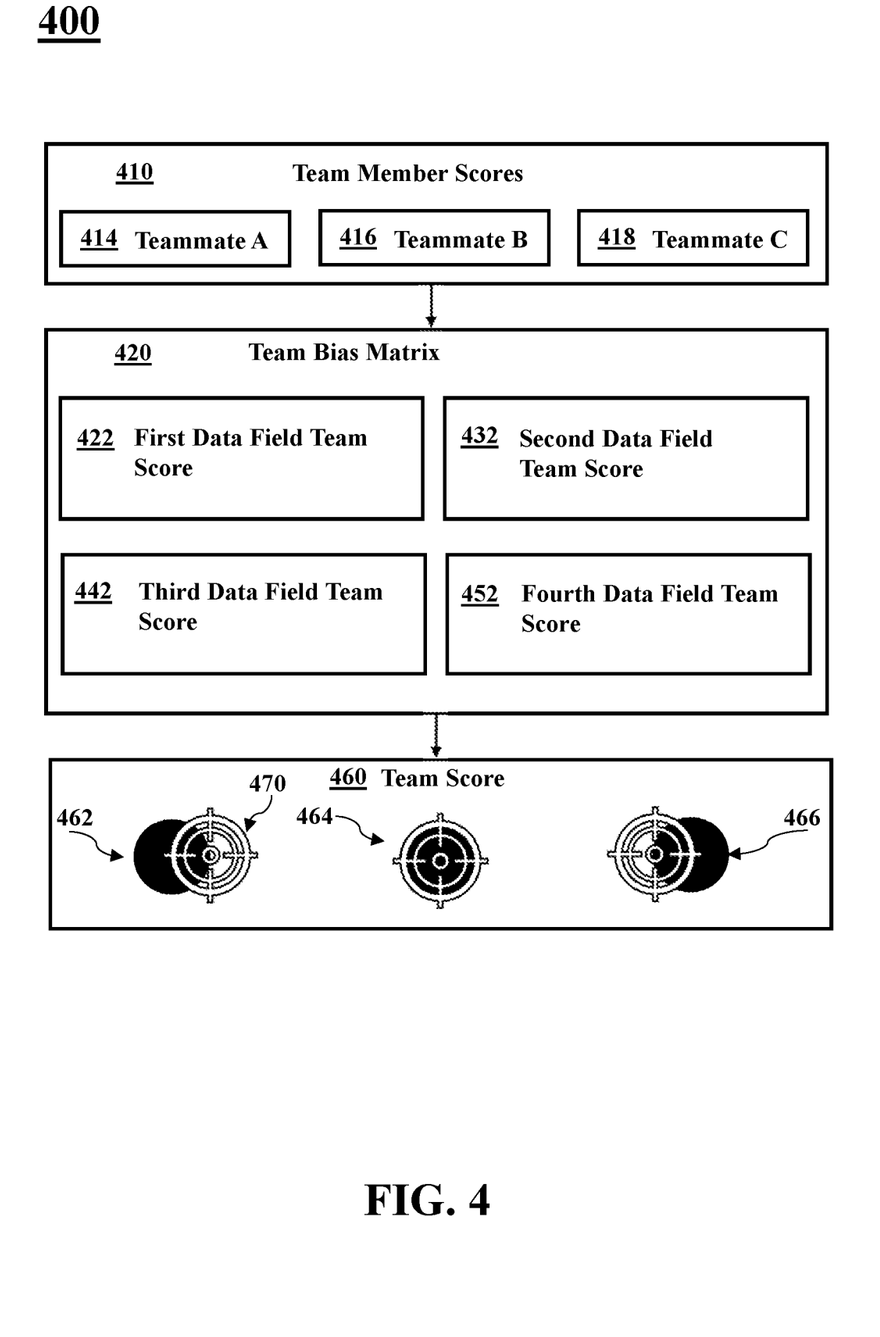
FIG. 4 illustrates a flowchart of generating a team predisposition score according to embodiments of the disclosure.

FIG. 4 illustrates a flowchart of generating a team (bias) score 400 according to embodiments of the disclosure. In some embodiments of the present disclosure, a bias matrix is computed for multiple users in a group, and a bias score is computed for and associated with each member of the group. In some embodiments, the bias matrices for the users of the group is aggregated into a group bias matrix associated with the collective bias of the group.

A team score 460 may be calculated by combining the team member scores 410. A team may include multiple individuals. An individual who is part of a team may be referred to as a member, a team member, or a member of a team. Each team member may have unique experiences and biases. Individual bias scores may be computed for each team member, and the data collected from computing the individual bias score of each team member may be used to compile a team (bias) score 460.

Team member scores 410 and the affiliated data may be aggregated. Individual bias score data for teammate A 414, teammate B 416, and teammate C 418 (e.g., which may be generated based on any of the exemplary solutions provided herein, such as in regard to FIG. 2) may be aggregated and compiled into a team bias matrix 420. The team bias matrix 420 may include a first data field team score 422, a second data field team score 432, a third data field team score 442, and a fourth data field team score 452. The team bias matrix 420 may be used to compute a team score 460. The team score 460 may show the cumulative bias of the team.

Each score within the team bias matrix 420 may be a compilation of scores from the various members of the team. Team member scores 410 may be preserved in the team bias matrix 420 or may be numerically aggregated with the other team member scores. For example, in some contexts, it may be helpful for a team to identify specifically which member of a team is best suited for a particular task and, thus, it may be beneficial to be able to compare team member scores directly within the team bias matrix; the same team may be expected to report the ability of the team as a unit to address information in an unbiased way, and thus may prefer to aggregate the scores to show team balance while preserving the privacy of team members.

To preserve this flexibility, each score 422, 432, 442, and 452 within the team bias matrix 420 may include a matrix of scores for each data field, averages of team member scores, summation of team member scores, some other numerical aggregation of team member scores, or some combination thereof. The team bias matrix 420 may thus be a matrix of aggregated scores, coordinates, codes, or a matrix of matrices.

Each score 422, 432, 442, and 452 within the team bias matrix 420 may be calculated using team member scores. For example, a first data field team score 422 may be the aggregate of first field data respectively associated to each of the teammate A 414, teammate B 416, and teammate C 418. In some embodiments, each of the second, third, and fourth data field team scores 432, 442, and 452 may be generated in the same fashion.

The team bias matrix 460 may itself be considered a team score 460 or it may be used to compute a team score 460. A team score 460 may represent the biases of the team as a collective unit. A team score 460 may be assessed against a specified target 470.

In some embodiments, the collective bias of a team may be compared to a target 470 to identify bias. A team may be found to have a negative collective bias 462, no or neutral collective bias 464, or positive collective bias 466. Collective team bias may be assessed for individual data field types (e.g., background) or in the aggregate.

A team may use their team bias assessment in various applications. For example, a team may construct a team score 460 to identify biases and thereby become aware of strengths and weaknesses in the team with respect to biases and thereby enable mitigation. In some embodiments, a prospective addition to a team may be assessed for an individual bias score and the individual bias score may be compared with or incorporated into the team score 460 to determine whether the candidate is a proper fit for achieving certain goals which may be gauged, for example, to measure whether the individual biases of the candidate help to neutralize biases present on the team.

Bias detection may be done on a local computer, on a remote computer, on the cloud, or may use any suitable combination thereof.

An aspect of the disclosure is detection of bias scores using the internet. Some embodiments of the present disclosure may utilize a natural language parsing and/or sub-parsing component. Thus, aspects of the disclosure may relate to natural language processing. Accordingly, an understanding of the embodiments of the present invention may be aided by describing embodiments of natural language processing systems and the environments in which these systems may operate.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
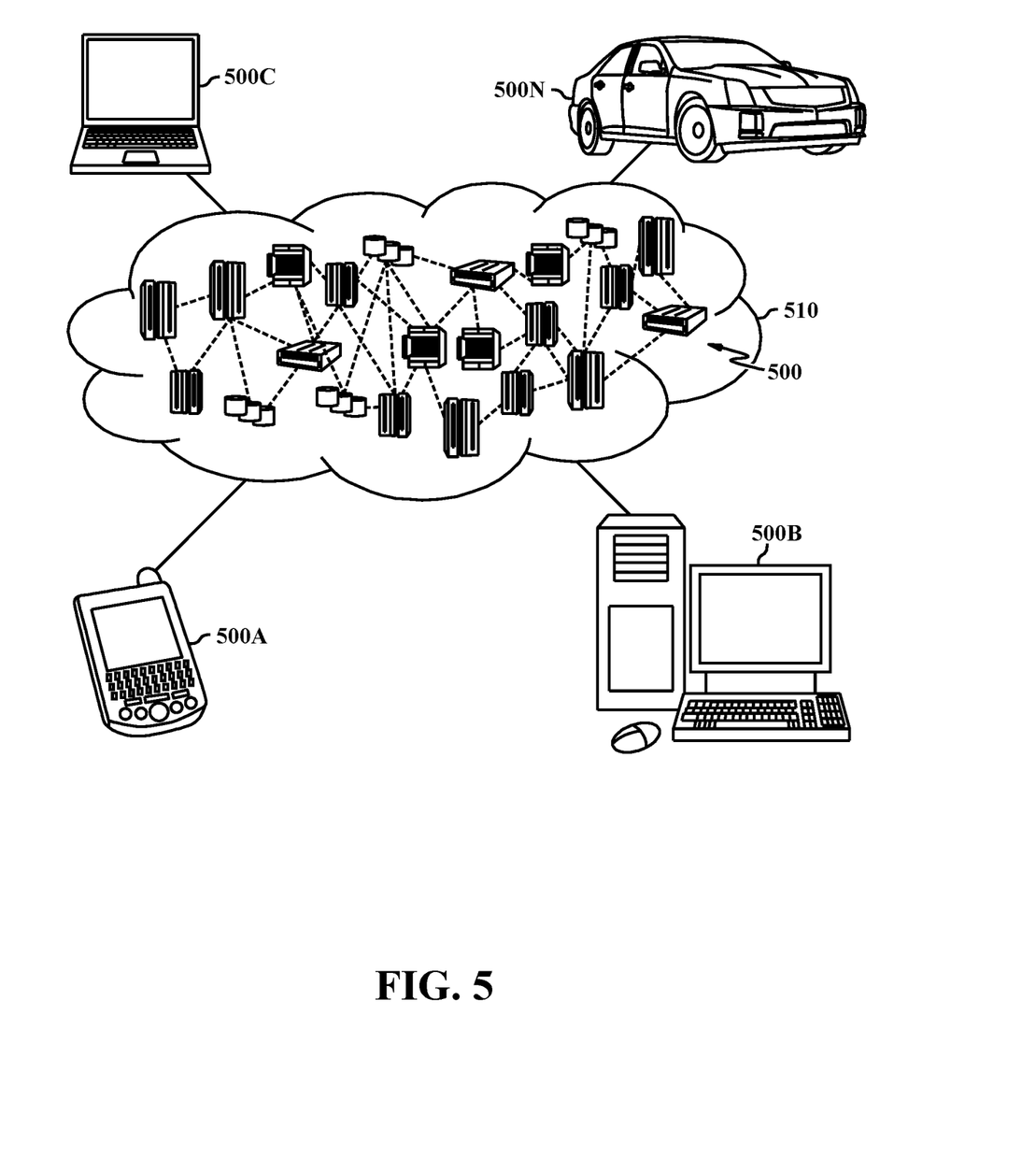
FIG. 5 illustrates a cloud computing environment, in accordance with embodiments of the present disclosure.

FIG. 5 illustrates a cloud computing environment 510 in accordance with embodiments of the present disclosure. As shown, cloud computing environment 510 includes one or more cloud computing nodes 500 with which local computing devices used by cloud consumers such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as private, community, public, or hybrid clouds as described hereinabove, or a combination thereof.

This allows cloud computing environment 510 to offer infrastructure, platforms, and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Figure 6:
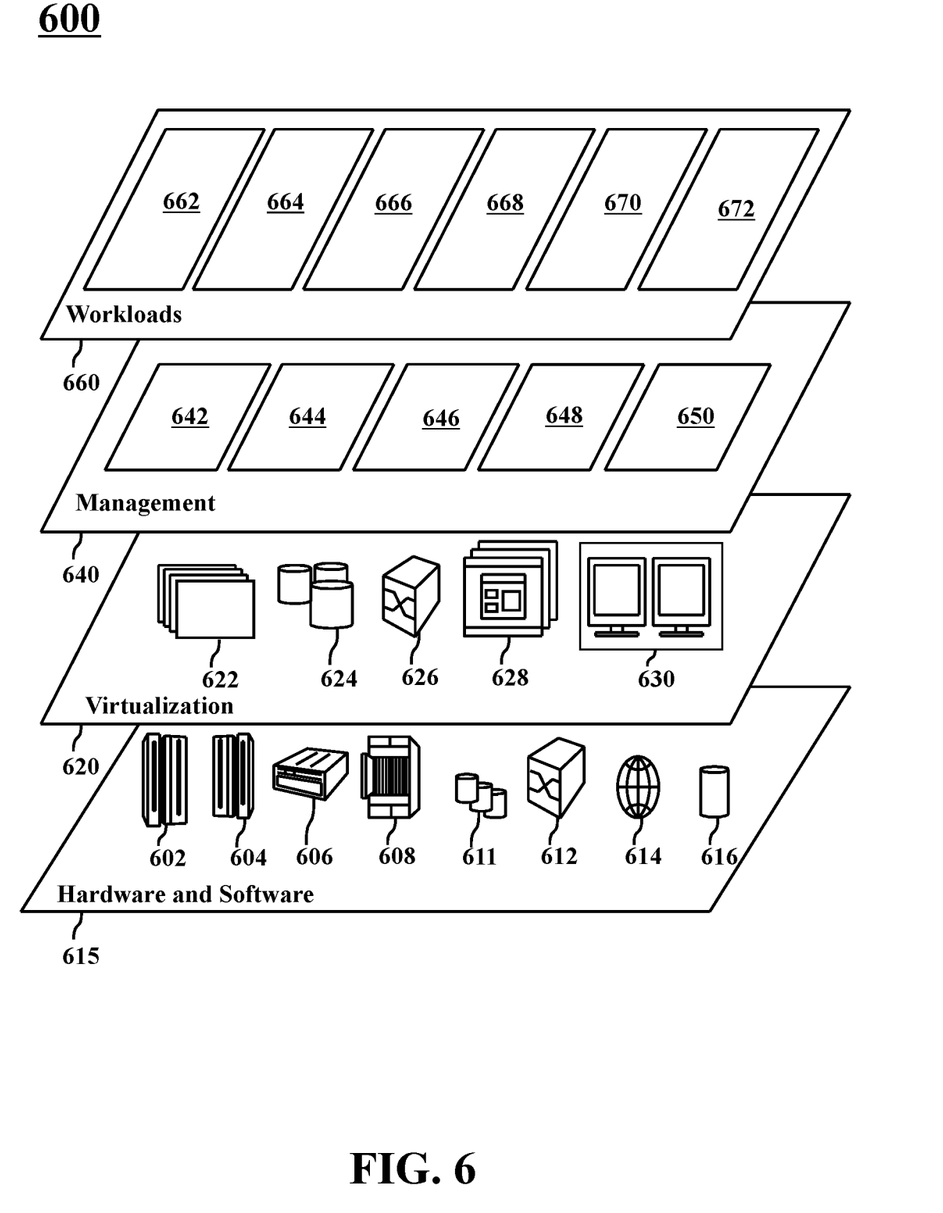
FIG. 6 illustrates abstraction model layers, in accordance with embodiments of the present disclosure.

FIG. 6 illustrates abstraction model layers 600 provided by cloud computing environment 510 (FIG. 5) in accordance with embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 615 includes hardware and software components. Examples of hardware components include: mainframes 602; RISC (Reduced Instruction Set Computer) architecture-based servers 604; servers 606; blade servers 608; storage devices 611; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and pricing 644 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 646 provides access to the cloud computing environment for consumers and system administrators. Service level management 648 provides cloud computing resource allocation and management such that required service levels are met. Service level agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 666; data analytics processing 668; transaction processing 670; and bias detection 672.

Figure 7:
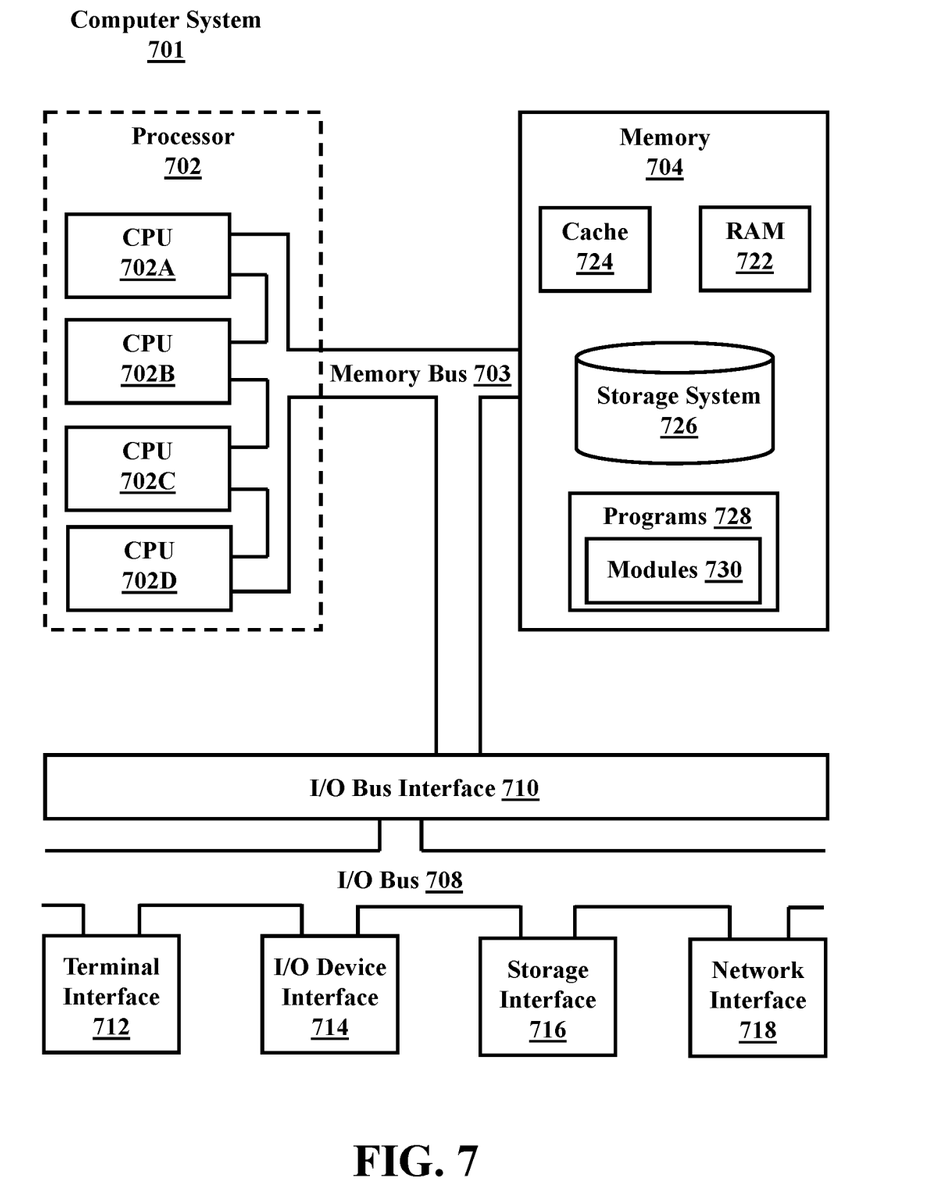
FIG. 7 illustrates a high-level block diagram of an example computer system that may be used in implementing one or more of the methods, tools, and modules, and any related functions, described herein, in accordance with embodiments of the present disclosure.

FIG. 7 illustrates a high-level block diagram of an example computer system 701 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 701 may comprise a processor 702 with one or more central processing units (CPUs) 702A, 702B, 702C, and 702D, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable CPUs 702A, 702B, 702C, and 702D, herein generically referred to as the CPU 702. In some embodiments, the computer system 701 may contain multiple processors typical of a relatively large system; however, in other embodiments, the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 830, may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units 710 are shown, which separate the I/O bus 708 from various communications paths running to the various I/O devices, in other embodiments some or all of the I/O devices may be connected directly to one or more system I/O buses 708.

In some embodiments, the computer system 701 may be a multi-user mainframe computer system, a single-user system, a server computer, or similar device that has little or no direct user interface but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A computer-implemented method, said method comprising:
    identifying a plurality of data fields of interest;
    receiving data for each of said plurality of data fields of interest, wherein said data is received from a plurality of data sources, wherein said receiving data comprises:
        accepting user input data from a second user;
        harvesting social media for social media data, wherein said harvesting social media for social media data comprises analyzing one or more interactions with posts;
        providing said second user with a prompt; and
        analyzing user results from said prompt;
    computing a plurality of bias scores for said plurality of data fields of interest based on said data, wherein each bias score of said plurality of bias scores is a quantitative assessment of a bias in a corresponding data field of said plurality of data fields of interest;
    developing a bias matrix with said plurality of bias scores, wherein said bias matrix is associated with a member of a group, wherein said group comprises a plurality of members, wherein said bias matrix is respectively computed for each member of a group of users;
    aggregating said respective bias matrix for each member of said group of users into a group bias matrix;
    incorporating said bias matrix into said group bias matrix, wherein said group bias matrix is associated with a collective bias of said group; and
    mitigating a model bias of an artificial intelligence model using said group bias matrix.

2. The method of claim 1 wherein said receiving data further comprises:
    harvesting social media for social media data for said second user.

3. The method of claim 1 wherein said prompt comprises one or more inquiries of said second user.

4. The method of claim 1 wherein said posts include metadata associated with said data.

5. The method of claim 1 wherein said computing one or more bias scores comprises:
    aggregating said data into one or more data field groups wherein each of said one or more data field groups is associated with a data field of interest; and
    evaluating an output for each of said one or more data field groups wherein said output is a bias score.

6. The method of claim 5 wherein said computing one or more bias scores further comprises:
    classifying one or more types of bias into bias classifications.

7. The method of claim 1 wherein said data comprises at least competency data and awareness data, wherein said competency data includes at least one of education data and career data.

8. The method of claim 1 wherein at least one of said one or more data fields are selected from the group consisting of background and personality.

9. The method of claim 1 wherein each of the one or more bias scores is respectively associated with each member.

10. The method of claim 9 wherein said group bias matrix is associated with a collective bias of said group of users.

11. A system, said system comprising:
    a memory; and
    a processor in communication with said memory, said processor being configured to perform operations comprising:
        identifying a plurality of data fields of interest;
        receiving data for each of said plurality of data fields of interest, wherein said data is received from a plurality of data sources, wherein said receiving data comprises:
            accepting user input data from a second user;
            harvesting social media for social media data, wherein said harvesting social media for social media data comprises analyzing one or more interactions with posts;
            providing said second user with a prompt; and
            analyzing user results from said prompt;
        computing a plurality of bias scores for said plurality of data fields of interest based on said data, wherein each bias score of said plurality of bias scores is a quantitative assessment of a bias in a corresponding data field of said plurality of data fields of interest;
        developing a bias matrix with said plurality of bias scores, wherein said bias matrix is associated with a member of a group, wherein said group comprises a plurality of members, and wherein said bias matrix is respectively computed for each member of a group of users;
        aggregating said respective bias matrix for each member of said group of users into a group bias matrix;
        incorporating said bias matrix into a group bias matrix, wherein said group bias matrix is associated with a collective bias of said group; and
        mitigating a model bias of an artificial intelligence model using said group bias matrix.

12. The system of claim 11 wherein said receiving data further comprises:

harvesting social media for social media data for said second user.

13. The system of claim 11 wherein said computing one or more bias scores comprises:
aggregating said data into one or more data field groups wherein each of said one or more data field groups is associated with a data field of interest; and
evaluating an output for each of said one or more data field groups wherein said output is a bias score.

14. The system of claim 11 wherein said data comprises at least competency data and awareness data, wherein said competency data includes at least one of education data and career data.

15. The system of claim 11 wherein at least one of said one or more data fields are selected from the group consisting of background and personality.

16. The system of claim 11 wherein each of the one or more bias scores is respectively associated with each member.

17. A computer program product, said computer program product comprising a computer readable storage medium having program instructions embodied therewith, said program instructions executable by a processor to cause said processor perform a function, said function comprising:
identifying a plurality of data fields of interest;
receiving data for each of said plurality of data fields of interest, wherein said data is received from a plurality of data sources, wherein said receiving data comprises:
accepting user input data from a second user;
harvesting social media for social media data, wherein said harvesting social media for social media data comprises analyzing one or more interactions with posts;
providing said second user with a prompt; and
analyzing user results from said prompt;
computing a plurality of bias scores for said plurality of data fields of interest based on said data, wherein each bias score of said plurality of bias scores is a quantitative assessment of a bias in a corresponding data field of said plurality of data fields of interest;
developing a bias matrix with said plurality of bias scores, wherein said bias matrix is associated with a member of a group, wherein said group comprises a plurality of members, and wherein said bias matrix is respectively computed for each member of a group of users;
aggregating said respective bias matrix for each member of said group of users into a group bias matrix;
incorporating said bias matrix into a group bias matrix, wherein said group bias matrix is associated with a collective bias of said group; and
mitigating a model bias of an artificial intelligence model using said group bias matrix.

18. The computer program product of claim 17 wherein said receiving data further comprises:
harvesting social media for social media data for said second user.

19. The computer program product of claim 17 wherein said computing one or more bias scores comprises:
aggregating said data into one or more data field groups wherein each of said one or more data field groups is associated with a data field of interest; and
evaluating an output for each of said one or more data field groups wherein said output is a bias score.

20. The computer program product of claim 17 wherein said data comprises at least competency data and awareness data, wherein said competency data includes at least one of education data and career data.

21. The computer program product of claim 17 wherein at least one of said one or more data fields are selected from the group consisting of background and personality.

22. The computer program product of claim 17 wherein each of the one or more bias scores is respectively associated with each member.

* * * * *